United States Patent [19]

Arena

[11] Patent Number: 4,520,122

[45] Date of Patent: May 28, 1985

[54] IMMOBILIZATION OF ORGANIC SPECIES ON REFRACTORY INORGANIC OXIDES

[75] Inventor: Blaise J. Arena, Des Plaines, Ill.

[73] Assignee: UOP Inc., Des Plaines, Ill.

[21] Appl. No.: 558,398

[22] Filed: Dec. 5, 1983

[51] Int. Cl.$^3$ .................. B01J 20/22; B01J 31/38; B01J 31/36; B01D 15/08

[52] U.S. Cl. ........................ 502/152; 55/386; 210/656; 252/184; 502/7; 502/150; 502/155; 502/158; 502/162; 502/224; 502/227; 502/401

[58] Field of Search ............... 502/150, 152, 155, 158, 502/401–403; 210/656

[56] References Cited

U.S. PATENT DOCUMENTS

| | | | |
|---|---|---|---|
| 3,359,214 | 12/1967 | Aftadilian | 502/158 |
| 3,956,179 | 5/1976 | Sebestian et al. | 502/158 |
| 4,199,330 | 4/1980 | Nestrick et al. | 502/401 |
| 4,333,847 | 6/1982 | Tran et al. | 502/152 |
| 4,377,555 | 3/1983 | Hancock et al. | 210/682 |
| 4,416,992 | 11/1983 | Arena et al. | 435/176 |

Primary Examiner—P. E. Konopka
Attorney, Agent, or Firm—William H. Page, II; Eugene I. Snyder

[57] ABSTRACT

A broad variety of modified inorganic oxides may be prepared by surface-metallating the oxide with a metal tetrahalide followed by displacement of a halogen bonded to the metal by a nucleophilic organic functional group. The results are organic moieties coating the surface of the oxide by being covalently bonded to a metal which, in turn, is covalently bonded to an oxygen originally associated with a surface hydroxyl of the inorganic oxide.

20 Claims, No Drawings

IMMOBILIZATION OF ORGANIC SPECIES ON REFRACTORY INORGANIC OXIDES

Refractory inorganic oxides find diverse uses in chemical processes. For example, many are used per se as a catalyst for reactions, where their Lewis acid properties often are responsible for their catalytic activity. They also are used as supports for catalysts, especially as carriers for metals catalytically active in reforming, hydrogenation, and oxidation, to name but a few processes. Refractory inorganic oxides also have found broad use as adsorbents in chromatography.

However diverse may be the current application of refractory inorganic oxides there remains an impetus to modify these materials to further extend their applications via their newly acquired desirable properties. In this context I have discovered a general method of modifying porous refractory inorganic oxides to afford a broad variety of finished products. One such product, a support matrix for immobilized enzymes, has been described in Ser. No. 362,206, now U.S. Pat. No. 4,416,992.

SUMMARY OF THE INVENTION

The purpose of this invention is to prepare surface modified refractory inorganic oxides. An embodiment comprises contacting a porous refractory inorganic oxide with certain metal tetrahalides and subsequently reacting the resulting surface-metallated oxide with a reagent having a nucleophilic group so as to bind the reagent covalently to the metal. In a more specific embodiment the oxide is alumina or silica, the metal is titanium, and the reagent has an hydroxyl, amino, sulfhydryl, or phosphino moiety.

DESCRIPTION OF THE INVENTION

It long has been known that refractory inorganic oxides are in reality complex materials. For example, the materials of commerce referred to as "alumina" and "silica" are not simply represented by the formulae $AL_2O_3$ and $SiO_2$, respectively. Instead such materials usually are "hydrates" in that they contain varying amounts of water which may be removed at elevated (and usually considerably elevated) temperatures. In large part the "hydrates" are manifested as surface hydroxyl groups, themselves important modifiers of the surface properties of refractory inorganic oxides such as alumina and silica. I have discovered that such surface hydroxyls can react with various metal tetrahalides with formation of an oxygen-metal bond to produce materials which I refer to herein as surface-metallated inorganic oxides. I have further discovered that the halogens remaining bonded to the metal may be displaced by various nucleophiles, especially nucleophilic functional groups of organic materials, resulting in a new covalent bond between the metal and the nucleophilic atom of the organic molecule. The result is an inorganic oxide bearing a plethora of organic moieties on its surface via a metal as a mediating link.

In one aspect the invention herein is a method of preparing a modified refractory inorganic oxide comprising contacting a porous oxide with a metal tetrahalide so as to produce a surface-metallated oxide, removing the excess of unreacted metal tetrahalide, contacting the surface-metallated oxide with an organic reagent having at least one nucleophilic functional group so as to displace at least one halogen from the metal and thereby covalently bond the organic reagent to the metal, removing unreacted organic reagent, and recovering the resulting modified inorganic oxide. In another aspect the invention herein is the product obtained thereby.

It is to be clearly understood that the refractory inorganic oxides referred to herein are porous materials. That is, there are a multitude of pores and channels from the exterior of a discrete, macroscopic particle to the interior of the particle. Consequently, the surface of such oxides includes all the pores and channels of such materials, and the surface area as measured by nitrogen gas adsorption according to B.E.T. theory includes such surfaces. In fact, generally there will be more surface in the interior of a discrete, macroscopic particle than on its exterior. In this application "surface" is used in such an art-recognized fashion, and is not to be restricted to the physical exterior of a macroscopic particle.

Although I do not wish to be bound by any theory or conceptual framework, the working hypothesis I have employed makes my invention more understandable. The reactions thought to occur are represented by the following scheme, where M represents a metal, X is a halogen, ⌇⌇⌇ is a refractory inorganic oxide surface, where the second structure represents a surface-metallated inorganic oxide, and ANuH is an organic species bearing a nucleophilic functional group, NuH.

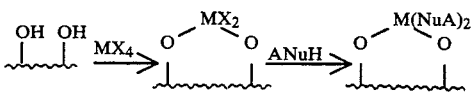

Although the above equation represents reaction of two of the four halogens with surface hydroxyls, it must be understood that from one to three halogens may react, with a corresponding change in the final structure of the modified inorganic oxide. It is to be clearly understood that the invention claimed herein includes all the species which may be so formed. I emphasize again that this is merely a working hypothesis, consistent with all available data, but I do not vouch for its veracity and I do not wish to be bound by it.

The porous refractory inorganic oxides which may be used on the practice of this invention include alumina, silica, thoria, titania, magnesia, and combinations thereof. Alumina and silica are preferred materials with alumina being especially desirable.

The porous refractory inorganic oxide is then contacted with a tetrahalide of a metal selected from the group consisting of titanium, zirconium, hafnium, vanadium, tantalum, niobium, silicon, germanium, tin, lead, and combinations thereof so as to produce a surface-metallated inorganic oxide. Among these titanium, zirconium, and vanadium are favored, with titanium being especially advantageous. The stability and availability of the various tetrahalides make the tetrachloride preferable to all others, but the tetrafluoride, tetrabromide, and tetraiodide may be used although not necessarily with equivalent results.

Contacting of the metal tetrahalide with the inorganic oxide may be done using neat metal tetrahalide where the latter is a liquid, using a solution of the halide, or by vapor deposition of the tetrahalide where its vapor pressure is sufficient.

Where the metal tetrahalide is a liquid it suffices to mix the inorganic oxide with said halide for a time from about 15 minutes to about 1 hour, depending upon the relative amounts of solid and liquid, the particular metal tetrahalide used, and so forth. When reaction is complete excess liquid is removed by decantation or filtration and the solid recovered. Where a solution of metal tetrahalide is used any solvent unreactive toward both the metal tetrahalide and inorganic oxide may be employed. Suitable solvents include diethylether, dipropylether, tetrahydrofuran, tetrahydropyran, and other ethers, ethylacetate, propylacetate, butyl acetate, and other esters. The concentration of metal tetrahalide is not important except insofar as it may affect reaction time. Surface metallation is achieved merely by mixing the solution with the inorganic oxide until reaction is complete, typically from about 1 hour to about 3 hours depending on solution concentration. As above, excess liquid is removed by decantation and/or filtration and the solid recovered.

Additional quantities of adhering but unreacted halide may be removed by washing the treated inorganic oxide with copious quantities of solvent. Any solvent, including the aforementioned ones, used to prepare solutions by which the inorganic oxide is metallated may also be utilized for the washing step.

Where the vapor pressure of the metal tetrahalide permits, vapor deposition is the method of choice for converting the surface hydroxyls to metallated specie. One reason is that it permits facile control of the amount of metal introduced. Another reason is that, in contrast to the prior methods using liquids, no excess adhering but unbound metal tetrahalide remains to be removed, thereby eliminating an entire step in the preparation.

Vapor deposition is done conveniently by contacting a stream of a gas, unreactive toward the metal tetrahalide and inorganic oxide under deposition conditions, containing vapors of metal tetrahalide with the oxide.

Suitable unreactive gases include nitrogen, helium, argon, the remaining inert group gases, and hydrogen at non-elevated temperatures. Where the gas stream is passed through a bed of alumina or silica, the amount of surface metallation varies with bed temperature, thereby affording some degree of control of metallation.

When the surface metallation is performed using liquid metal tetrahalide, whether neat or in solution, excess adhering but unbound halide remaining after decantation and/or washing must be removed. Where the halide is sufficiently volatile, the preferred method of removal is by heating the treated oxide in an inert atmosphere. The temperature will depend on such factors as inert gas flow and the specific metal tetrahalide used, and generally is in the range from about 80° to about 200° C. For example, where titanium tetrachloride is used a temperature from about 100° to about 200° C. for a time from about 1 to about 5 hours will suffice. Although a temperature above about 200° C. may be used no substantial advantage accrues therefrom.

It is to be emphasized that the heating step is unnecessary where surface metallation is performed by vapor deposition. It also needs to be emphasized that by "inert atmosphere" is meant an atmosphere in which the metal-halogen bond(s) of the surface-metallated inorganic oxide is unaffected. A minimum requirement is an atmosphere essentially free of water and oxygen. Thus heating in vacuo exemplifies a suitable procedure. Some commonly available gases providing an inert atmosphere, which are cited for illustrative purposes only, include nitrogen, helium, and argon.

It is believed that at this point I have material resulting from displacement of one or more halogens of the metal tetrahalide by an oxygen atom of the surface hydroxyls originally present on the inorganic oxide. The metal still has at least one halogen attached thereto which remains susceptible to nucleophilic displacement.

This material is then contacted with a reagent having at least one functional group which can displace the halogen from the metal, thereby forming a new bond between the metal and the functional group. In essence this bond acts as a link between the metallated inorganic oxide and the remainder of the molecule bearing the reactive functional group.

One class of reagents which may be used in the practice of this invention may be designated as RY, where R is a hydrocarbyl moiety and Y is an alkali metal. Within this class alkyl and aryl lithiums are particularly desirable because of their availability and ease of handling, especially where the alkyl moiety contains no more than about 10 carbon atoms and where the aryl moiety is the phenyl moiety. It will be recognized that the result of the reaction of the surface-metallated inorganic oxides prepared herein with RY is an inorganic oxide "coated" with hydrophobic hydrocarbon moieties.

Another class of reagents is characterized by the presence of at least one functional group selected from the group consisting of hydroxyl, amino, sulfhydryl, and phosphino moieties. Although the primary amino and phosphino moieties are preferred in the practice of this invention, secondary amino and phosphino moieties also may be used.

A reagent bearing one of the aforementioned functional groups often has at least one other functional group, especially carboxyl, amino, phosphino, and sulfonic acid moieties. Primary, secondary, tertiary, and even quaternary amino moieties are useful as second functional groups, as are monosubstituted, disubstituted, and trisubstituted phosphines. Among such reagents may be mentioned hydroxy carboxylic acids, hydroxy amines, amino carboxylic acids, and polyamines.

The excess of adhering but unbound reagent is then removed by washing the material with a suitable solvent. The nature of the solvent is unimportant so long as it is not independently reactive toward the underlying inorganic oxide or any of the groups now coating its surface. Often the solvent will be the same as that used for dissolving the reagents bearing the reactive functional group. Where the solvent is water miscible a final wash with water also may be advantageous.

The utility of the modified inorganic oxides prepared according to the invention herein is bounded only by one's imagination. The uses cited below illustrate only a few of the multitude possible.

For example, the materials prepared herein may be used as a substrate to immobilize complexed metals, i.e., making heterogeneous analogues of homogeneous catalysts. Many processes undergo homogeneous catalysis by complexed metals. For example, homogeneous catalysts are used, *inter alia*, in hydrogenation, carbonylation, polymerization, and isomerization and dismutation of alkenes. See, for example, *Homogeneous Catalysis By Metal Complexes*, V. I and II, N. M. Taqui Khan and A. E. Martell, Academic Press, New York (1974); *Homogeneous Catalysis*, G. W. Parshall, J. Wiley and Sons, New York (1980). Such homogeneous catalysts are transition metals often complexed with ammonia or amines and with phosphines. For example, chloro tris (triphenylphosphine) rhodium (I) is an example of an effective catalyst in homogeneous hydrogenations. See, for example, S. J. McQuillin, *Homogeneous Hydrogenation in Organic Chemistry*, D. Reidel Publishing Company, Holland (1976). One can prepare analogues of such homogeneous catalysts using the modified inorganic oxides of this invention where the reagent is bifunctional and where the remaining unreacted functional group on the modified alumina is a phosphino or amino moiety which can complex with transition metals.

The modified aluminas herein also find utility as ion exchange material. In this application the reagent is an hydroxy or amino carboxylic acid or an hydroxy or amino quaternary amine.

The materials of this invention may be catalysts in themselves. For example, where the bifunctional reagent carries a sulfonic acid group the modified inorganic oxides may be sufficiently acidic to heterogeneously catalyze reactions requiring a strong acid catalyst.

Inorganic oxides used in the practice of this invention are themselves hydrophilic. However, where the surface-metallated inorganic oxides are reacted with RY, as previously described, their surface is coated with a hydrocarbon, thereby converting them into a hydrophobic material, or at the least substantially reducing their hydrophilic nature. This leads to important changes in the properties of the materials when used, for example, as chromatographic adsorbents.

As previously stated the uses cited above are merely illustrative and are not intended to be exhaustive. In a similar fashion the examples below merely illustrate this invention which is not intended to be thereby limited thereto.

EXAMPLE 1

To 50 g of gamma-alumina spheres was added sufficient neat titanium tetrachloride to cover the spheres. After 15 minutes at room temperature, excess titanium tetrachloride was removed by decantation and the spheres were dried at 150° C. in nitrogen. The cooled spheres can be conveniently stored in nitrogen.

To a solution of 4.93 g of p-aminobenzoic acid in 50 ml of tetrahydrofuran was added 6.0 g of the surface-titanated gamma-alumina whose preparation was described above. The spheres turned orange immediately upon contact, and after 15 minutes at room temperature excess liquid was removed by decantation. The spheres were then washed, first with tetrahydrofuran, then with water, to remove residual p-aminobenzoic acid. The orange spheres were vacuum dried. Analysis showed 7.0% Ti, 2.32% C, and 1.08% H, corresponding to about 2.8% p-aminobenzoic acid. Other compounds immobilized in a similar manner include p-aminosulfonyl fluoride, mercapto acetic acid, and 2-chloro-4-aminobenzoic acid.

The materials prepared above were characterized by the determination of surface acidity using ammonium ion exchange. See Holm, *J. Phys. Chem.*, 63, 129 (1959). A 1.00 g sample of a modified alumina was agitated with 25.0 ml of 0.1 M ammonium acetate for 24 hours. The absorption of ammonium ion by the immobilized acid as measured by a drop in solution pH is a qualitative indicator of the presence of acid as well as a quantitative measure of the acid strength and/or concentration. Results are summarized below.

TABLE

| Immobilized Species | pH | ΔpH (relative to NH$_4$Ac) |
| --- | --- | --- |
| NH$_4$Ac (blank) | 6.93 | 0 |
| 2-chloro-4-aminobenzoic acid | 6.10 | −0.83 |
| p-aminobenzoic acid | 5.73 | −1.2 |
| p-aminobenzenesulfonyl fluoride | 6.43 | −0.50 |
| Control (Al$_2$O$_3$ only) | 7.41 | +0.48 |

Thus, the modified aluminas all show acidity, whereas the control (titanated gamma-alumina) is basic.

EXAMPLE 2

To 1 g of titanated alumina, prepared as described in Example 1 and containing 8.64% titanium, was added 2.75 g of neat 1,5-diaminopentane. After 16 hours at room temperature, excess diamine was removed by thorough washing with water. The diamine-modified alumina also was prepared by reacting a 5% solution of 1,5-diamino-pentane in tetrahydrofuran with the titanated alumina at room temperature. Excess diamine again was removed by thorough water washing. Other polyamine-modified aluminas may be prepared in an analogous fashion.

EXAMPLE 3

TiCl$_4$ treated gamma-alumina spheres (5 g) were placed in 20 mL of pentane. To this was added 10 mL of 1 $\overline{M}$ n-butyllithium. The alumina immediately turned blue. The mixture was allowed to stand for 1 hour and then the alumina was washed thoroughly with pentane. (The addition to untreated Al$_2$O$_3$ of n-butyl Li gives no reaction.) The washed beads were dried under vacuum and stored under N$_2$. Infrared spectroscopy indicated the presence of alkyl groups on the alumina surface.

What is claimed is:

1. A method of preparing a modified refractory inorganic oxide comprising reacting the surface hydroxyl groups of a porous refractory inorganic oxide selected from the group consisting of alumina, silica, thoria, titania, magnesia, and combinations thereof with a tetrahalide of an element selected from the group consisting of titanium, zirconium, hafnium, vanadium, tantalum, niobium, germanium, tin, lead, and combinations thereof so as to produce a surface-metallated inorganic oxide, removing excess and unreacted metal tetrahalide, heating the metal inorganic oxide at a temperature from about 80° to about 200° C. in an inert atmosphere for a time sufficient to volatilize any remaining unreacted metal tetrahalide, reacting the resulting material with an organic reagent having at least one functional group selected from the group consisting of hydroxyl, amino, sulfhydryl, and phosphino moieties, or with RY where R is a hydrocarbyl moiety and Y is an alkali metal, removing excess adhering but unreacted reagent, and recovering the resulting modified refractory inorganic oxide.

2. The method of claim 1 where the inorganic oxide is alumina.

3. The method of claim 1 where the inorganic oxide is silica.

4. The method of claim 1 where the tetrahalide is a tetrachloride.

5. The method of claim 1 where the metal is titanium.

6. The method of claim 1 where the metal is zirconium.

7. The method of claim 1 where the metal is vanadium.

8. The method fo claim 1 where the reagent has a hydroxyl group.

9. The method of claim 8 where the reagent is a hydroxy carboxylic acid or a hydroxy amine.

10. The method of claim 1 where the reagent has an amino group.

11. The method of claim 10 where the reagent is an amino carboxylic acid or a polyamine.

12. The method of claim 1 where RY is an alkyl or aryl lithium.

13. The product made by the method of claim 1.

14. The product of claim 13 where the inorganic oxide is alumina.

15. The product of claim 13 where the inorganic oxide is silica.

16. The product of claim 13 where the tetrahalide is the tetrachloride of titanium, zirconium, or vanadium.

17. The product of claim 13 where the reagent has an hydroxyl group.

18. The product of claim 13 where the reagent has an amino group.

19. The product of claim 13 where the reagent is a hydroxy carboxylic acid, amino carboxylic acid, hydroxy amine, or polyamine.

20. The product of claim 13 where RY is an alkyl or aryl lithium.

* * * * *